(12) United States Patent
Wang et al.

(10) Patent No.: US 11,928,035 B2
(45) Date of Patent: Mar. 12, 2024

(54) METHOD, APPARATUS AND COMPUTER PROGRAM PRODUCT FOR RECOVERING DATA

(71) Applicant: EMC IP Holding Company LLC, Hopkinton, MA (US)

(72) Inventors: Qi Wang, Shanghai (CN); Weiyang Liu, Shanghai (CN); Yuanyi Liu, Shanghai (CN); Zengjie Zhang, Shanghai (CN); Jin Ru Yan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 16/807,190

(22) Filed: Mar. 3, 2020

(65) Prior Publication Data
US 2021/0117292 A1    Apr. 22, 2021

(30) Foreign Application Priority Data
Oct. 16, 2019  (CN) .......................... 201910983239.8

(51) Int. Cl.
*G06F 11/00* (2006.01)
*G06F 11/14* (2006.01)
*G06F 11/34* (2006.01)

(52) U.S. Cl.
CPC ...... *G06F 11/1469* (2013.01); *G06F 11/3419* (2013.01); *G06F 2201/84* (2013.01)

(58) Field of Classification Search
CPC ............. G06F 11/1469; G06F 11/3419; G06F 11/1458; G06F 11/1464; G06F 11/1448; G06F 11/3409; G06F 11/3433
See application file for complete search history.

(56) References Cited

U.S. PATENT DOCUMENTS

| | | | |
|---|---|---|---|
| 7,822,717 B2* | 10/2010 | Kapoor | G06F 11/1471 707/680 |
| 2018/0300206 A1* | 10/2018 | Dai | G06N 5/02 |
| 2018/0352032 A1* | 12/2018 | Liu | G06F 11/14 |

* cited by examiner

*Primary Examiner* — Katherine Lin
(74) *Attorney, Agent, or Firm* — Chamberlain, Hrdlicka, White, Williams, & Aughtry; Aly Z. Dossa (57) ABSTRACT

Embodiments of the present disclosure relate to a method, a device and a computer program product for recovering data. The method comprises in response to receiving a request to recover data from a backup node to a source node, determining a plurality of candidate backup nodes having copies of the data; determining respective performance indicators of the plurality of candidate backup nodes; and determining, from the plurality of candidate backup nodes, the backup node for recovering the data to the source node based on the respective performance indicators of the plurality of candidate backup nodes.

11 Claims, 4 Drawing Sheets

METHOD, APPARATUS AND COMPUTER PROGRAM PRODUCT FOR RECOVERING DATA

CROSS-REFERENCE TO RELATED APPLICATIONS

This application claims benefit to Chinese Patent Application 201910983239.8 filed on Oct. 16, 2019. Chinese Patent Application 201910983239.8 is hereby incorporated by reference in its entirety.

FIELD

Embodiments of the present disclosure generally relate to the field of data storage, and specifically to a method, a device and a computer program product for recovering data.

BACKGROUND

In modern storage systems, in order to avoid data loss at a data source, a plurality of copies of data are usually stored at storage nodes located at different locations. The data source is also referred to as a "source node" and a storage node for storing a copy of the data is referred to as a "backup node". When data at the source node is lost or unavailable, the copies of the data stored at the backup nodes can be used to recover the data at the source node. When there are a plurality of copies of the data, it is desirable to identify an optimal backup node for recovering the data at the source node from the plurality of backup nodes that store the plurality of copies.

SUMMARY

Embodiments of the present disclosure provide a method, a device and a computer program product for recovering data.

According to a first aspect of the present disclosure, there is provided a method for recovering data. The method comprises: in response to receiving a request to recover data from a backup node to a source node, determining a plurality of candidate backup nodes having copies of the data, wherein the source node has backed up a plurality of copies of the data to the plurality of candidate backup nodes respectively; determining respective performance indicators of the plurality of candidate backup nodes; and determining, from the plurality of candidate backup nodes, the backup node for recovering the data to the source node based on the respective performance indicators of the plurality of candidate backup nodes.

According to a second aspect of the present disclosure, there is provided an electronic device. The device comprises at least one processing unit and at least one memory. The at least one memory is coupled to the at least one processing unit and stores instructions for execution by the at least one processing unit. The instructions, when executed by the at least one processing unit, cause the device to perform acts comprising: in response to receiving a request to recover data from a backup node to a source node, determining a plurality of candidate backup nodes having copies of the data, wherein the source node has backed up a plurality of copies of the data to the plurality of candidate backup nodes respectively; determining respective performance indicators of the plurality of candidate backup nodes; and determining, from the plurality of candidate backup nodes, the backup node for recovering the data to the source node based on the respective performance indicators of the plurality of candidate backup nodes.

According to a third aspect of the present disclosure, there is provided a computer program product that is tangibly stored on a non-transitory computer storage medium and includes machine-executable instructions. The machine-executable instructions, when executed by an apparatus, cause the apparatus to execute any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

In all figures, the same or corresponding reference numbers denote the same or corresponding parts.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

As described above, in modern storage systems, in order to avoid data loss at a data source, a plurality of copies of data are usually stored at storage nodes located at different locations. In the text, the data source is also referred to as a "source node" and a storage node for storing a copy of the data is referred to as a "backup node". When data at the source node is lost or unavailable, the copies of the data stored at the backup nodes can be used to recover the data at the source node. When there are a plurality of copies of the data, it is desirable to identify an optimal backup node for recovering the data at the source node from the plurality of backup nodes that store the plurality of copies.

Embodiments of the present disclosure propose a solution for recovering data. In this solution, in response to receiving a request to recover data from a backup node to a source node, a plurality of candidate backup nodes having copies of the data are determined, wherein the source node has backed up a plurality of copies of the data to the plurality of candidate backup nodes, respectively. Respective performance indicators of the plurality of candidate backup nodes are determined. In addition, the backup node for recovering the data to the source node is determined from the plurality of candidate backup nodes based on the respective performance indicators of the plurality of candidate backup nodes. In this way, when the data at the source node is lost or unavailable, the optimal backup node for recovering data at the source node can be identified from the plurality of backup nodes storing copies of the data, thereby improving the data recovery efficiency and enhancing user satisfaction.

Figure 1:
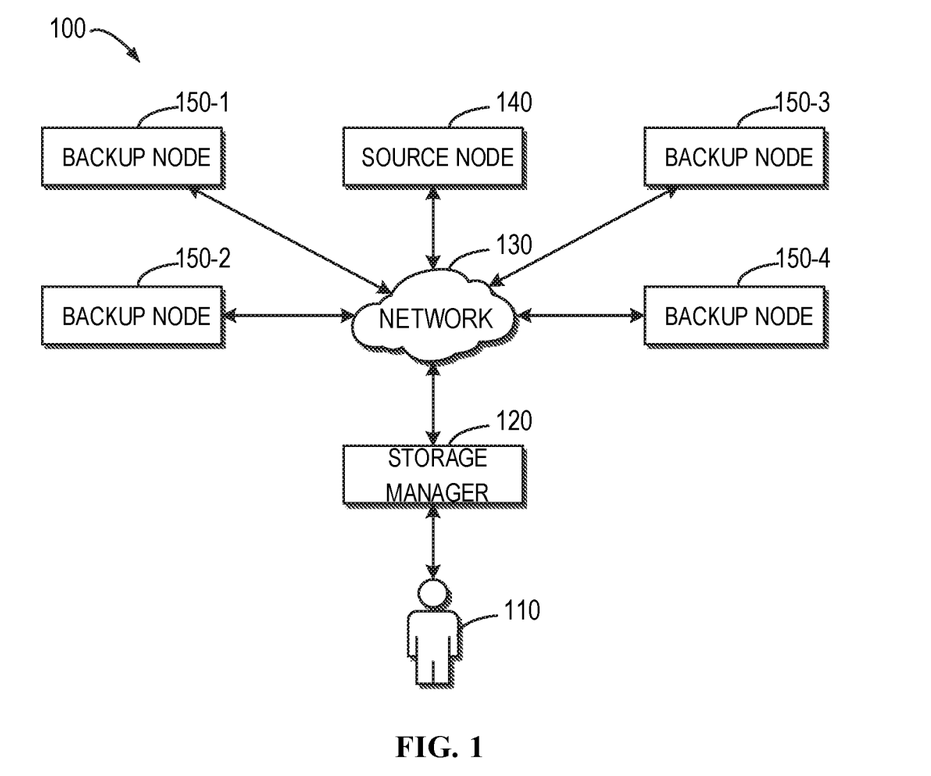
FIG. 1 illustrates a schematic diagram of an example environment in which embodiments of the present disclosure may be implemented.

Hereinafter, embodiments of the present disclosure will be described in detail with reference to the figures. FIG. 1 illustrates a block diagram of an example environment 100 in which embodiments of the present disclosure can be implemented. It is to be understood that the structure of the environment 100 is described only for the purpose of illustration, without suggesting any limitation to the scope of the present disclosure.

As shown in FIG. 1, the environment 100 may include a storage manager 120 and one or more storage nodes 140 and 150-1 to 150-4. The storage manager 120 may be implemented using any physical host, server, virtual machine, etc., which may provide a user interface to interact with a user 110. The storage manager 120 may be communicatively coupled to the one or more storage nodes 140 and 150-1 to 150-4 via a network 130 (e.g., the Internet). Each of the storage nodes 140 and 150-1 to 150-4 may be implemented with any physical computer, server, etc., and may include a storage device (not shown in FIG. 1) for storing data. The storage device in the storage node may be implemented for example by using any storage medium currently known or to be developed in the future, such as a magnetic disk, an optical disk, a disk array, or the like.

In some embodiments, the user 110 may send a data backup request to the storage manager 120 to back up, for example, data at the storage node 140 to one or more of the storage nodes 150-1 to 150-4. Hereinafter, the storage node 140 is also referred to as a "source node 140", and the storage nodes 150-1 to 150-4 are referred to as "backup nodes 150-1 to 150-4" respectively or collectively referred to as "backup nodes 150". In response to receiving the data backup request, the storage manager 120 may send a command to the source node 140 to cause the source node 140 to send copies of the data to the one or more backup nodes 150. For example, in some embodiments, the source node 140 may send a copy of the data to the backup node 150-1, and then the backup node 150-1 may send copies of the data to other backup nodes 150-2, 150-3 and 150-4. In this case, the backup node 150-1 is also referred to as a "primary backup node", and the other backup nodes 150-2, 150-3 and 150-4 are referred to as "replica backup nodes", respectively. In some embodiments, the data backup may be performed periodically. For example, a user may send a periodic data backup request to the storage manager 120 to periodically (e.g., at 20:00 PM every day) back up the data from the source node 140 to the one or more backup nodes 150.

In some embodiments, for example, when data at the source node 140 is lost or unavailable, or when a version of the data at the source node 140 has been updated and the user desires to roll back to a previous version (e.g., roll back to a version backed up at 20:00 PM yesterday), the user 110 may send a data recovery request to the storage manager 120 to recover the specified version of data at the source node 140. In some embodiments, in response to receiving the data recovery request, the storage manager 120 may determine one or more backup nodes that have copies of the version of data, such as the backup nodes 150-1 to 150-4.

In some embodiments, the storage manager 120 may present the backup nodes 150-1 to 150-4 having the copies of the version of data via a user interface. The user 110 may select a backup node for recovering the data at the source node 140 from the presented backup nodes 150-1 to 150-4 via the user interface. In response to receiving selection of the backup node by the user 110, the storage manager 120 may send a command to the source node 140 and/or the backup node to instruct the source node 140 to obtain, from the backup node, a copy of the data to be recovered, thereby achieving data recovery.

Alternatively, in some embodiments, when the storage manager 120 determines the backup nodes 150-1 to 150-4 having the copies of the version of data, the storage manager 120 may further determine respective performance indicators of the backup nodes 150-1 to 150-4, and select, from the backup nodes 150-1 to 150-4 and based on the determined performance indicators, an optimal backup node suitable for recovering the data at the source node 140. In some embodiments, the storage manager 120 may directly send a command to the source node 140 and/or the optimal backup node to instruct the source node 140 to obtain from the optimal backup node a copy of the data to be recovered, thereby implementing the data recovery. Alternatively, in other embodiments, the storage manager 120 may present the backup nodes 150-1 to 150-4 having the copies of the version of data and highlight the optimal backup node via the user interface. The user 110 may select whether to use the copy of data at the optimal backup node to recover the data at the source node 140 via the user interface. In response to receiving the selection of the optimal backup node by the user 110, the storage manager 120 may send a command to the source node 140 and/or the optimal backup node to instruct the source node 140 to obtain from the optimal backup node the copy of the data to be recovered, thereby implementing data recovery.

Figure 2:
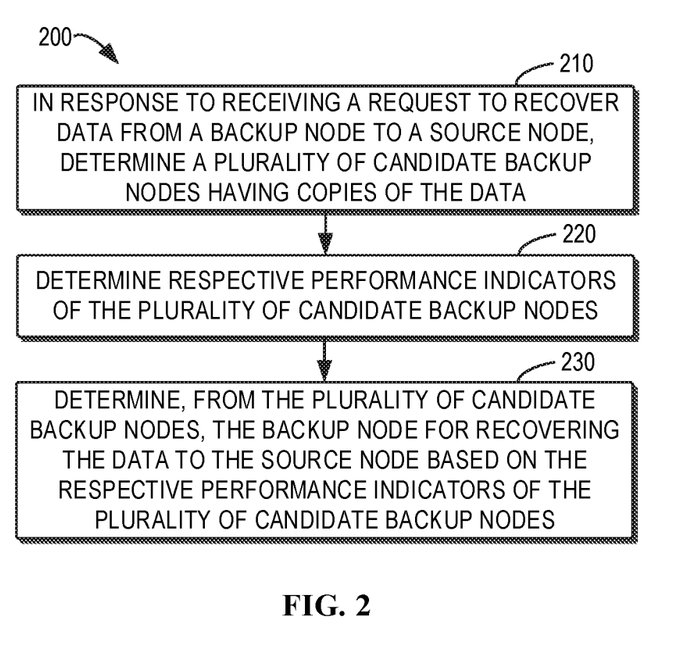
FIG. 2 illustrates a flowchart of an example method for recovering data according to embodiments of the present disclosure.

FIG. 2 illustrates a flowchart of an example method 200 for recovering data according to embodiments of the present disclosure. For example, the method 200 may be performed by the storage manager 120 as shown in FIG. 1. The method 200 will be described in detail below with reference to FIG. 1. It is to be understood that the method 200 may further include an additional action not shown and/or some action as shown may be omitted, and the scope of the present disclosure is not limited in this regard.

At block 210, the storage manager 120 determines, in response to receiving a request to recover data from a backup node to the source node 140, a plurality of candidate backup nodes having copies of the data. For example, the source node 140 has backed up a plurality of copies of the data to the backup nodes 150-1 to 150-4, respectively. That is, the plurality of candidate backup nodes may include, for example, the backup nodes 150-1 to 150-4 as shown in FIG. 1.

At block 220, the storage manager 120 determines respective performance indicators of the plurality of candidate backup nodes 150-1 to 150-4.

In some embodiments, the storage manager 120 may determine, for each candidate backup node 150 of the plurality of candidate backup nodes 150-1 to 150-4, at least one of the following: a request response time between the source node 140 and the candidate backup node 150, an amount of tasks at the candidate backup node 150, an input/output (I/O) load level at the candidate backup node 150, and a network bandwidth at the candidate backup node 150.

In some embodiments, in order to determine the request response time between the source node 140 and the candidate backup node 150, the storage manager 120 may instruct the source node 140 to send a ping command to the candidate backup node 150. The source node 140 may determine a time when a response to the ping command is received and report the time to the storage manager 120. In some embodiments, the amount of tasks at the candidate backup node 150 may indicate the number of jobs (e.g., data backup jobs and/or other jobs, etc.) being performed at the candidate backup node 150. In some embodiments, the I/O load level at the candidate backup node 150 may include, for example, a throughput rate of read operations and a throughput rate of write operations performed at the candidate backup node 150. In some embodiments, for example, the network bandwidth at the candidate backup node 150 may include a total network bandwidth and/or a remaining available network bandwidth supported by the candidate backup node 150.

Figure 3:
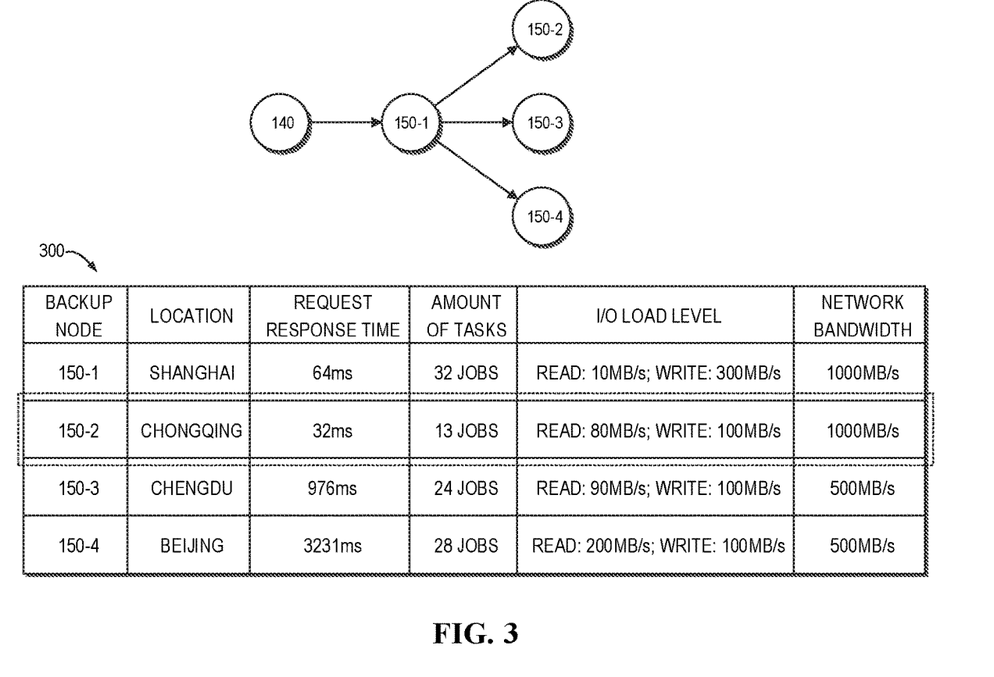
FIG. 3 illustrates a schematic diagram of example performance indicators of backup nodes according to embodiments of the present disclosure.

FIG. 3 illustrates a schematic diagram of example performance indicators of backup nodes determined according to embodiments of the present disclosure. As shown in FIG. 3, for example, the source node 140 first backs up data to the primary backup node 150-1, and then backs up the data to the replica backup nodes 150-2, 150-3 and 150-4 via the primary backup node 150-1. Table 300 shows respective locations of the primary backup node 150-1 and the replica backup nodes 150-2, 150-3 and 150-4, the request response time between each backup node and the source node 140, the amount of tasks, the I/O load level, and the network bandwidth of each backup node.

It is to be understood that the above performance indicators are merely exemplary. In other embodiments, for each of the plurality of candidate backup nodes 150-1 to 150-4, the storage manager 120 may further determine other performance indicators in addition to the above performance indicators, such as a CPU usage rate, a memory usage rate and so on. The scope of the present disclosure is not limited in this regard.

At block 230, the storage manager 120 determines, based on the respective performance indicators of the plurality of candidate backup nodes 150-1 to 150-4, the backup node for recovering data to the source node 140 from the plurality of candidate backup nodes 150-1 to 150-4.

In some embodiments, the storage manager 120 may determine respective scores of the multiple candidate backup nodes 150-1 to 150-4 based on the respective performance indicators of the plurality of candidate backup nodes 150-1 to 150-4, wherein a score of each candidate backup node 150 indicates a possibility that the candidate backup node 150 is selected as the backup node for recovering data to the source node 140.

In some embodiments, the storage manager 120 may determine the score of the candidate backup node 150 by weighting multiple performance indicators of each of the plurality of candidate backup nodes 150-1 to 150-4. Additionally or alternatively, before weighting multiple performance indicators of each candidate backup node 150, each performance indicator of the candidate backup node 150 can be classified and scored first, and the classified and scored results of the candidate backup node 150 can be weighted, thereby determine the score of the candidate backup node 150. The classification and scoring can avoid the problem of large score differences due to small differences in performance indicators. For example, Table 1 shows an example of performing the classification and scoring on each of the performance indicators. It is to be understood that the specific scores shown in Table 1 and the ranges of performance indicators corresponding to the specific scores are shown for exemplary purposes, without suggesting any limitation to the scope of the present disclosure.

TABLE 1

| Performance indicator | Score: 3 | Score: 2 | Score: 1 |
| --- | --- | --- | --- |
| Request response time | <800 ms | 800 ms~2000 ms | >2000 ms |
| Amount of tasks | <15 jobs | 16~25 jobs | >25 jobs |
| I/O load level | <100 MB/s | 100 MB/s~300 MB/s | >300 MB/s |
| Network bandwidth | ≥10000 MB/s | 10000 MB/s~1000 MB/s | <1000 MB/s |

In some embodiments, the storage manager 120 may, for example, determine the score of each candidate backup node 150 according to the following equation:

$$\text{score} = \omega_1 \cdot \alpha + \omega_2 \cdot \beta + \omega_3 \cdot \gamma + \omega_4 \cdot \delta \tag{1}$$

where α represents a result of performing the classification and scoring on the request response time, β represents a result of performing the classification and scoring on the amount of tasks, γ represents a result of performing the classification and scoring on the I/O load level, and δ represents a result of performing the classification and scoring on the network bandwidth. For example, as shown in Table 1, the value of each of α, β, γ and δ may be 1, 2 or 3. It is to be understood that if the scores for the classification and scoring are different from those shown in Table 1, the range of values of each of α, β, γ and δ may be different. $\omega_1$ to $\omega_4$ represent weights assigned to α, β, γ and δ, respectively, and they may be predetermined values. In some embodiments, for example, $\omega_1 > \omega_2 > \omega_3 > \omega_4$. In this manner, the storage manager 120 can determine the score of each candidate backup node 150.

In some embodiments, the storage manager 120 may select, based on the respective scores of the plurality of candidate backup nodes 150-1 to 150-4, a backup node for recovering data to the source node 140 from the plurality of candidate backup nodes 150-1 to 150-4. For example, the storage manager 120 may select a candidate backup node having the highest score from the plurality of candidate backup nodes 150-1 to 150-4 as the backup node for recovering data to the source node 140. In the example as shown in FIG. 3, for example, the backup node 150-2 is the backup node having the highest score.

In this way, the storage manager 120 can identify the optimal backup node for recovering the data at the source node from the plurality of backup nodes storing copies of the data.

In some embodiments, the storage manager 120 may further cause the source node 140 to obtain a copy of the data from the determined backup node (for example, the backup node 150-2) to recover the data to the source node 140. For example, the storage manager 120 may directly send a command to the source node 140 and/or the backup node 150-2 to instruct the source node 140 to obtain, from the backup node 150-2, a copy of the data to be recovered, thereby implementing data recovery.

Alternatively, in some embodiments, the storage manager 120 may present the backup nodes 150-1 to 150-4 having the copies of the version of data and highlight the optimal backup node 150-2 via the user interface. The user 110 may select whether to use the copy of data at the optimal backup node 150-2 to recover the data at the source node 140 via the user interface. In response to receiving the selection of the optimal backup node 150-2 by the user 110, the storage manager 120 may send a command to the source node 140 and/or the optimal backup node 150-2 to instruct the source node 140 to obtain from the optimal backup node 150-2 the copy of the data to be recovered, thereby implementing data recovery.

It can be seen from the above depictions that, embodiments of the present disclosure propose a solution for recovering data. In this solution, in response to receiving a request to recover data from a backup node to a source node, a plurality of candidate backup nodes having copies of the data are determined, wherein the source node has backed up a plurality of copies of the data to the plurality of candidate backup nodes, respectively. Respective performance indicators of the plurality of candidate backup nodes are determined. In addition, the backup node for recovering the data to the source node is determined from the plurality of candidate backup nodes based on the respective performance indicators of the plurality of candidate backup nodes. In this way, when the data at the source node is lost or unavailable, the optimal backup node for recovering data at the source node can be identified from the plurality of backup nodes storing copies of the data, thereby improving the data recovery efficiency and enhancing user satisfaction.

Figure 4:
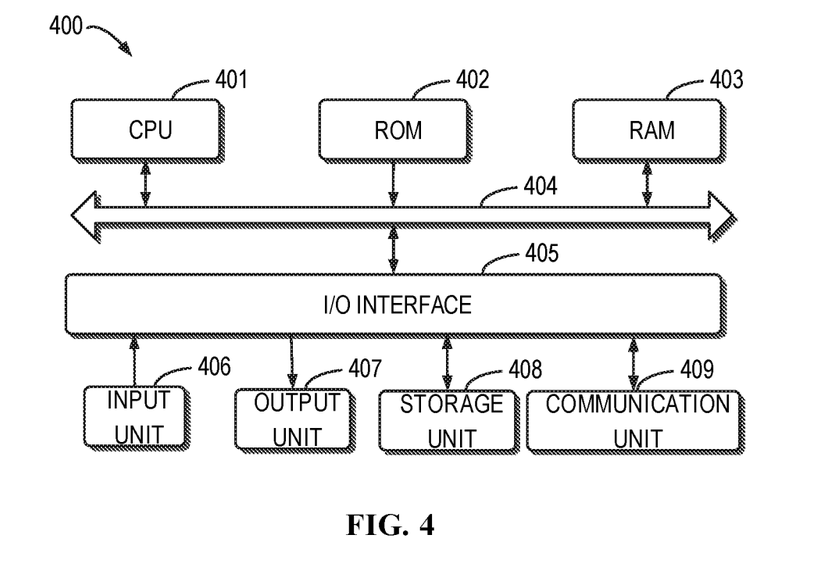
FIG. 4 illustrates a schematic block diagram of an example device that can be used to implement embodiments of the present disclosure.

FIG. 4 illustrates a block diagram of an example device 400 adapted to implement embodiments of the present disclosure. For example, the storage manager 120 as shown in FIG. 1 may be implemented by the device 400. As shown, the device 400 includes a central processing unit (CPU) 401, which can execute various suitable actions and processing based on the computer program instructions stored in the read-only memory (ROM) 402 or computer program instructions loaded in the random-access memory (RAM) 403 from a storage unit 408. The RAM 403 can also store all kinds of programs and data required by the operations of the device 400. CPU 401, ROM 402 and RAM 403 are connected to each other via a bus 404. The input/output (I/O) interface 405 is also connected to the bus 404.

A plurality of components in the device 400 is connected to the I/O interface 405, including: an input unit 406, such as keyboard, mouse and the like; an output unit 407, e.g., various kinds of display and loudspeakers etc.; a storage unit 408, such as magnetic disk and optical disk etc.; and a communication unit 409, such as network card, modem, wireless transceiver and the like. The communication unit 409 allows the device 400 to exchange information/data with other devices via the computer network, such as Internet, and/or various telecommunication networks.

The above described procedure and processing, such as the method 200, can also be executed by the processing unit 401. For example, in some embodiments, the method 200 can be implemented as a computer software program tangibly included in the machine-readable medium, e.g., storage unit 408. In some embodiments, the computer program can be partially or fully loaded and/or mounted to the device 400 via ROM 402 and/or communication unit 409. When the computer program is loaded to RAM 403 and executed by the CPU 401, one or more steps of the method 200 as described above can be implemented.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote a computer is involved, the remote computer can be connected to the user computer via any type of network, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusively for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method for recovering data, comprising:
   in response to receiving a request to recover data to a source node, determining a plurality of candidate backup nodes (CBNs) having copies of the data, wherein the source node has backed up a copy of the data to a first backup node of the plurality of CBNs, wherein the first backup node has backed up the copy of the data to at least a second backup node of the plurality of CBNs, a third backup node of the plurality of CBNs, and a fourth backup node of the plurality of CBNs;
   determining first performance indicators (PIs) of the plurality of CBNs, wherein determining the first PIs of the plurality of CBNs comprises determining, for a given CBN of the plurality of CBNs, a request response time between the source node and the given CBN;
   selecting, from the plurality of CBNs, a selected CBN for recovering the data to the source node based on a performance score (PS) of the selected CBN comprises:
      scoring second PIs of the selected CBN to obtain scored PIs;
      determining the PS of the selected CBN by linearly weighting the scored PIs of the selected CBN;
   presenting the plurality of CBNs on a user interface, wherein the selected CBN is highlighted on the user interface; and
   in response to receiving selection of the selected CBN, sending a command to the selected CBN to instruct the source node to obtain the copy of the data from the selected CBN to recover the data to the source node.

2. The method according to claim 1, wherein determining the first PIs of the plurality of CBNs further comprises determining, for the given CBN of the plurality of CBNs, at least one of the following:
   an amount of tasks executing on the given CBN;
   an input/output load level at the given CBN; and
   a network bandwidth at the given CBN.

3. The method according to claim 1, wherein selecting the selected CBN from the plurality of CBNs comprises:
   selecting a CBN having a highest score among the plurality of CBNs as the selected CBN.

4. An electronic device, comprising:
   at least one processing unit;
   at least one memory coupled to the at least one processing unit and storing instructions for execution by the at least one processing unit, the instructions, when executed by the at least one processing unit, causing the device to perform a method, the method comprising:
   in response to receiving a request to recover data to a source node, determining a plurality of candidate backup nodes (CBNs) having copies of the data, wherein the source node has backed up a copy of the data to a first backup node of the plurality of CBNs, wherein the first backup node has backed up the copy of the data to at least a second backup node of the plurality of CBNs, a third backup node of the plurality of CBNs, and a fourth backup node of the plurality of CBNs;

determining first performance indicators (PIs) of the plurality of CBNs, wherein determining the first PIs of the plurality of CBNs comprises determining, for a given CBN of the plurality of CBNs, a request response time between the source node and the given CBN;

selecting, from the plurality of CBNs, a selected CBN for recovering the data to the source node based on a performance score (PS) of the selected CBN comprises:
    scoring second PIs of the selected CBN to obtain scored PIs;
    determining the PS of the selected CBN by linearly weighting the scored PIs of the selected CBN;

presenting the plurality of CBNs on a user interface, wherein the selected CBN is highlighted on the user interface; and in response to receiving selection of the selected CBN, sending a command to the selected CBN to instruct the source node to obtain the copy of the data from the selected CBN to recover the data to the source node.

5. The device according to claim 4, wherein determining the first PIs of the plurality of CBNs further comprises determining, for the given CBN of the plurality of CBNs, at least one of the following:
    an amount of tasks executing on the given CBN;
    an input/output load level at the given CBN; and
    a network bandwidth at the given CBN.

6. The device according to claim 4, wherein selecting the selected CBN from the plurality of CBNs comprises:
    selecting a CBN having a highest score among the plurality of CBNs as the selected CBN.

7. A non-transitory computer readable medium comprising machine-executable instructions, the machine-executable instructions, when executed by an apparatus, causing the apparatus to execute a method, the method comprising:
in response to receiving a request to recover data to a source node, determining a plurality of candidate backup nodes (CBNs) having copies of the data, wherein the source node has backed up a copy of the data to a first backup node of the plurality of CBNs, wherein the first backup node has backed up the copy of the data to at least a second backup node of the plurality of CBNs, a third backup node of the plurality of CBNs, and a fourth backup node of the plurality of CBNs;

determining first performance indicators (PIs) of the plurality of CBNs, wherein determining the first PIs of the plurality of CBNs comprises determining, for a given CBN of the plurality of CBNs a request response time between the source node and the given CBN;

selecting, from the plurality of CBNs, a selected CBN for recovering the data to the source node based on a performance score (PS) of the selected CBN comprises:
    scoring second PIs of the selected CBN to obtain scored PIs;
    determining the PS of the selected CBN by linearly weighting the scored PIs of the selected CBN;

presenting the plurality of CBNs on a user interface, wherein the selected CBN is highlighted on the user interface; and in response to receiving selection of the selected CBN, sending a command to the selected CBN to instruct the source node to obtain the copy of the data from the selected CBN to recover the data to the source node.

8. The non-transitory computer readable medium of claim 7, wherein determining the first PIs of the plurality of CBNs further comprises determining, for the given CBN of the plurality of CBNs, at least one of the following:
    an amount of tasks executing on the given CBN;
    an input/output load level at the given CBN; and
    a network bandwidth at the given CBN.

9. The method according to claim 1, wherein the request response time between the source node and the given CBN is determined by the source node sending a ping command to the given CBN.

10. The device according to claim 4, wherein the request response time between the source node and the given CBN is determined by the source node sending a ping command to the given CBN.

11. The non-transitory computer readable medium of claim 7, wherein the request response time between the source node and the given CBN is determined by the source node sending a ping command to the given CBN.

\* \* \* \* \*